United States Patent

Engle

[11] Patent Number: 5,826,685
[45] Date of Patent: Oct. 27, 1998

[54] COOLING SPOKE ARRANGEMENT FOR A BRAKE DISC

[75] Inventor: Thomas H. Engle, Clayton, N.Y.

[73] Assignee: Westinghouse Air Brake Company, Wilmerding, Pa.

[21] Appl. No.: 745,429

[22] Filed: Nov. 12, 1996

[51] Int. Cl.⁶ .................................................. F16D 65/78
[52] U.S. Cl. ................................ 188/264 A; 188/218 XL
[58] Field of Search ................................ 188/18 A, 70 R, 188/70 B, 218 XL, 264 A, 264 AA, 259; 192/71, 79, 107 T

[56] References Cited

U.S. PATENT DOCUMENTS

| | | | |
|---|---|---|---|
| 2,155,818 | 5/1939 | Carnes | 188/70 R |
| 2,167,297 | 7/1939 | Fitts | 188/70 R |
| 2,242,048 | 5/1941 | Ash | 188/70 R |
| 2,380,085 | 7/1945 | Tack et al. | 188/218 XL |
| 2,386,477 | 10/1945 | Kraft | 188/218 XL |
| 2,582,755 | 1/1952 | Kenny | 192/107 T |
| 3,146,859 | 9/1964 | Schmid | 188/70 R |
| 3,348,637 | 10/1967 | Perez | 188/218 XL |
| 3,394,780 | 7/1968 | Hodkinson | 188/218 XL |
| 3,780,835 | 12/1973 | Harrison | 192/79 |
| 5,544,726 | 8/1996 | Topouzian et al. | 188/218 XL |

FOREIGN PATENT DOCUMENTS

| | | | |
|---|---|---|---|
| 1510697 | 1/1968 | France | 188/218 XL |
| 297830 | 12/1988 | Japan | 188/218 XL |

Primary Examiner—Robert J. Oberleitner
Assistant Examiner—Chris Schwartz
Attorney, Agent, or Firm—James Ray & Associates

[57] ABSTRACT

A brake disk is described for attachment to rotating machinery to retard the rotating machinery. The disc has a hub for attachment to the rotating machinery. The hub is structurally connected by ribs to a rim having two annular portions spaced apart axially from one another which have at least one opening therebetween, and which have axisymmetric friction surfaces sloped in opposition to each other for contact with a brake shoe. The ribs are inclined relative to radii from the center of the disk and are substantially straight.

17 Claims, 3 Drawing Sheets

COOLING SPOKE ARRANGEMENT FOR A BRAKE DISC

CROSS REFERENCE TO RELATED APPLICATION

The invention taught in this patent application is closely related to the invention taught in the following co-pending patent application: Wedge-Shaped Disc Brake Shoe, Ser. No. 08/748,200 filed Nov. 12, 1996. The referenced patent application is being filed concurrently with the present application, and is assigned to the assignee of the present invention. Its teachings are incorporated into the present application by reference thereto.

FIELD OF THE INVENTION

The present invention relates, in general, to a brake disc for retardation of rotating machinery, and, more particularly, the invention relates to a brake disc for railway vehicles

BACKGROUND OF THE INVENTION

The art of railway brakes includes two methods of retarding a railroad vehicle. One method is to provide brake shoes which may be pressed against the wheels of the railroad vehicle, to provide a friction force which retards the wheels. A second method is to attach a disc to a wheel or to an axle of the vehicle, and press brake shoes against the disc, thereby providing a friction force which retards the disc and hence retards the wheels. In the first of these methods, heat is absorbed by the thermal mass of the wheels, and then dissipated to the environment by conduction, convection, and radiation from the wheels. In the second of these methods, heat is absorbed by the thermal mass of the brake discs, and then dissipated to the environment by conduction, convection, and radiation from the discs.

In both cases, the amount of energy which can be absorbed is limited by the temperatures generated, since high temperatures may damage the brake shoes, or cause thermal stresses which cause cracking of the wheels or brake discs. In some systems, the two methods are combined so that some of the heat is absorbed by the wheels, and some is absorbed by the discs. By combining the two methods, more heat can be absorbed than can be absorbed by either method separately.

Such systems generally employ a lever arrangement to provide equal or proportional force to the brake shoe or shoes applied to the wheel and the brake shoe or shoes applied to the disc. In some of these systems, brake shoes are applied to the rims of the brake discs. In others, brake shoes are applied to the faces of the discs. Application to the rim has an advantage over application to the face because the radius at which the friction force is generated is greater if it is applied to the rim rather than the face. Hence, the retarding torque exerted on the brake disc is greater when the shoe is applied with a given force to the rim than when the shoe is applied with the same force to the face.

For a railway vehicle, it is particularly important to apply the brake shoe at as great a radius as possible because the radius of the disc is limited by the required track clearance. In the United States, this is 2.75 inches, so the radius of the brake disc must be at least 2.75 inches less than the radius of the wheel tread.

It is generally desirable for a brake system to provide a system for applying pressure to the brake shoe which provides mechanical advantage to amplify the total normal force between the brake shoe and the surface being retarded.

For a brake shoe applied to the rim of a brake disc, prior attempts to accomplish this have been made by having the braking surface of the brake shoe have the form of a wedge, which is applied to a groove on the rim of the brake disc. With this configuration, the total normal force between the brake shoe and the brake disc is greater than the inward radial force applied to the shoe. An example of this is provided by U.S. Pat. No. 2,422,004.

Such configurations, however, are badly affected by tolerance in the position of the brake shoe relative to the brake disc in the direction of the axis of the brake disc. Variations in the exact relative axial positions of the brake shoe and the brake disc cause the apex of the wedge and the bottom of the groove on the brake disc to become rounded as wear occurs. Hence, a portion of the surface of the wedge at the apex of the wedge is not Inclined relative to the radius. Likewise a portion of the surface of the groove at the bottom of the groove is not inclined relative to the radius. A portion of the inward radial force applied to the brake shoe is then borne by these surface portions, and for this portion of the shoe force, the normal force is not amplified. Hence, after some wear occurs, such a brake looses efficiency.

Generally, brake discs designed for shoe application to the rim have the disadvantage that heat must flow some distance in the inward radial direction before there is sufficient surface area of the disc structure in contact with air to dissipate the heat generated by the brake shoe.

SUMMARY OF THE INVENTION

The present invention provides a brake disc having a hub for attachment to rotating machinery to retard the rotating machinery. The hub is structurally connected to a rim having two annular portions spaced apart axially from one another which have at least one opening therebetween, and which have axisymmetric friction surfaces sloped in opposition to each other for contact with a brake shoe.

OBJECTS OF THE INVENTION

It is, therefore, one of the primary objects of the present invention to provide a brake disc for attachment to rotating machinery for retardation of the rotating machinery in which the rim of the disc has friction surfaces configured so that when a brake shoe is pressed against them, the total normal force between the disc and the shoe has a mechanical advantage and is greater than the force on the shoe; the mechanical advantage not being degraded by wear of the friction surfaces or wear of the brake shoe.

Another object of the present invention is to provide a brake disc having friction surfaces on the rim of the disc to maximize the braking radius and hence the retarding torque caused by a brakeshoe applied to the friction surfaces.

An additional object of the present invention is to provide a brake disc having a pair of friction surfaces separated by air passages, to provide improved contact with air for cooling.

A related object of the present invention is to provide a brake disc having friction surfaces closely attached to vanes for improved contact with air for cooling.

In addition to the various objects and advantages of the present invention which have been generally described above, there will be various other objects and advantages of the invention that will become more readily apparent to those persons who are skilled in the braking art from the following more detailed description of the invention, particularly, when such detailed description is taken in conjunction with the attached drawing figures and with the appended claims.

BRIEF DESCRIPTION OF THE DRAWINGS

FIG. 2A shows an axial view of the disc and shows the section on which FIG. 1A and FIG. 1B are cut.

Figure 2A:
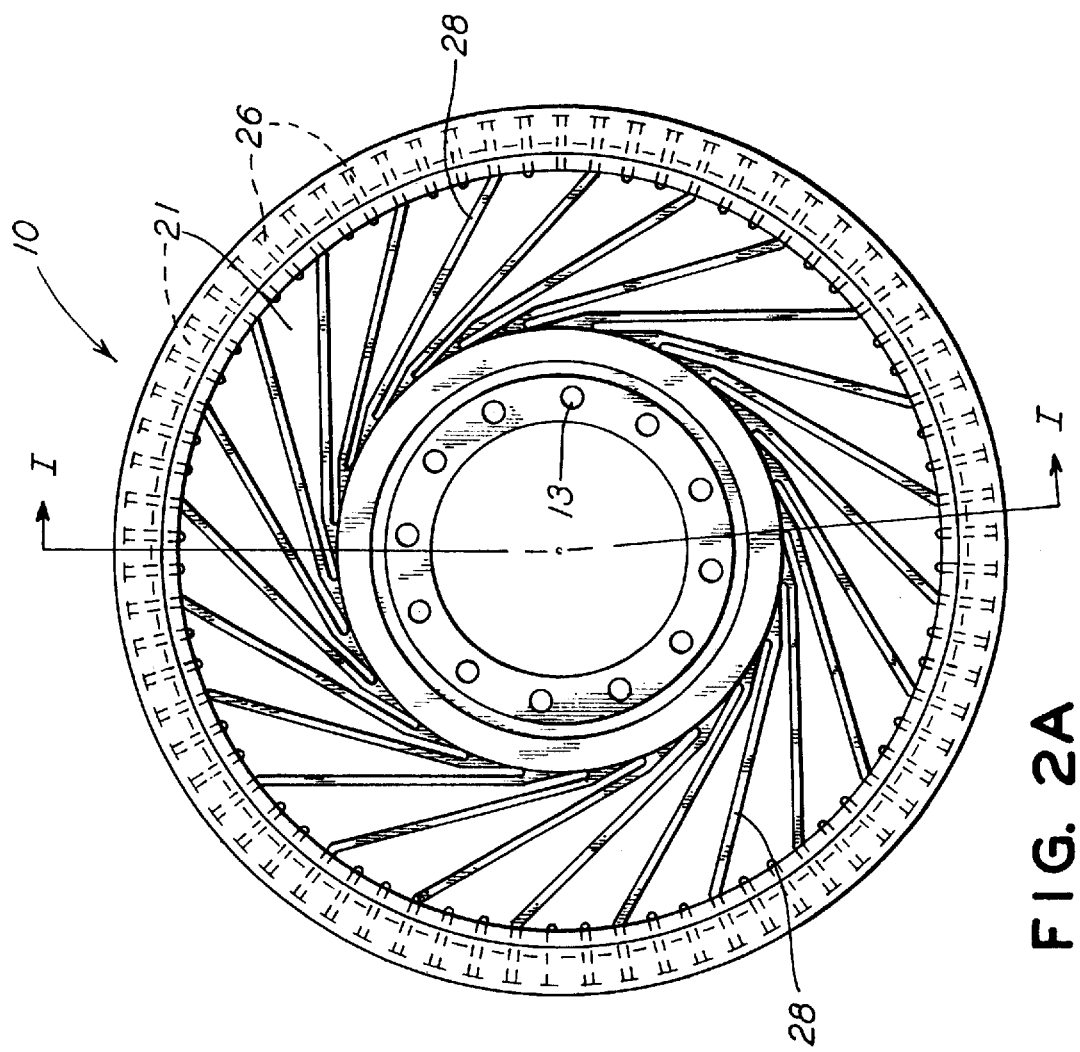

BRIEF DESCRIPTION OF THE PRESENTLY PREFERRED AND VARIOUS ALTERNATIVE EMBODIMENTS OF THE INVENTION

Prior to proceeding to the much more detailed description of the present invention, it should be noted that identical components which have identical functions have been identified with identical reference numerals throughout the several views illustrated in the drawing figures, for the sake of clarity and understanding of the invention.

Figure 1A:
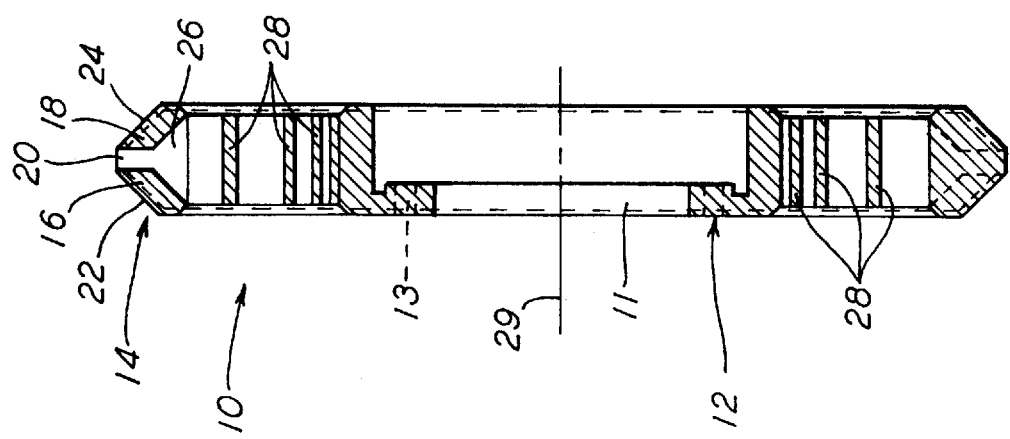
FIG. 1A shows a cross section of the disc of the present invention, which is cut approximately along a diameter.
Figure 1B:
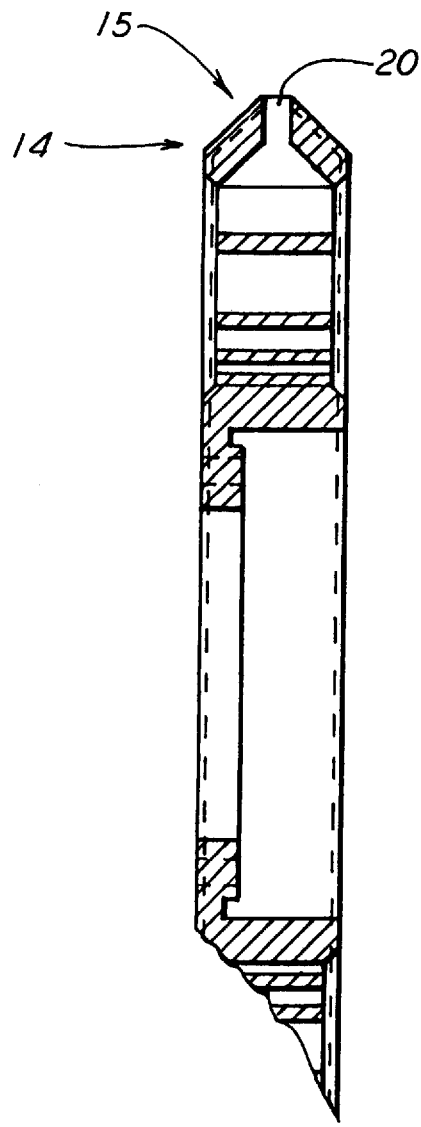
FIG. 1B shows a circumferential ridge at the periphery of the disk.
Figure 2B:
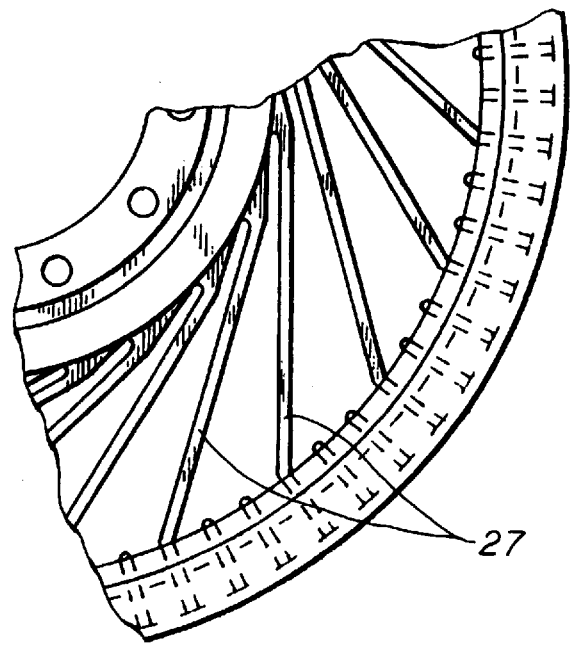
FIG. 2B has some spokes darkened to show attachment of spokes to the hub.

FIGS. 1A, 1B, 2A and 2B show a presently most preferred embodiment of the present invention. FIG. 2A shows a view looking parallel to the axis of the disc. This figure locates Section A—A, which is the section on which FIGS. 1A and 2B are at. The brake disc is generally denoted 10. It has a hub portion 12 and a rim portion 14, which are connected by spokes 28. The hub portion 12 has bolt holes 13 for attachment to rotating machinery which the disc is to retard. FIG. 1B shows that rim portion 14 is formed as a ridge 15 having a gap 20 cut out of its center. FIG. 2B is a view similar to FIG. 2A, but which has some of the spokes 28 darkened to show their attachment to hub portion 12. It is preferred that spokes 28 be relatively thin in comparison to their length to reduce weight and increase space for cooling air, and should be substantially straight, as shown in FIG. 2A and FIG. 2B.

Rim portion 14 has a first annular portion 16 and a second annular portion 18. It has a gap 20 and radial air passages 21 between first annular portion 16 and second annular portion 18. First annular portion 16 has a sloped first friction surface 22, and second annular portion 18 has a sloped second friction surface 24. Vanes 26 are located in gap 20, and they connect first annular portion 16 to second annular portion 18. Cooling of the vanes 26, the first annular portion 16, and the second annular portion 18 occurs by radial air flow through the air passages 21. Heat conducted into the spokes 28 from the vanes 26 is removed by airflow past the spokes and by radiation from the spokes. The axis 29 of the disc 10 is shown in FIG. 1.

Figure 3:
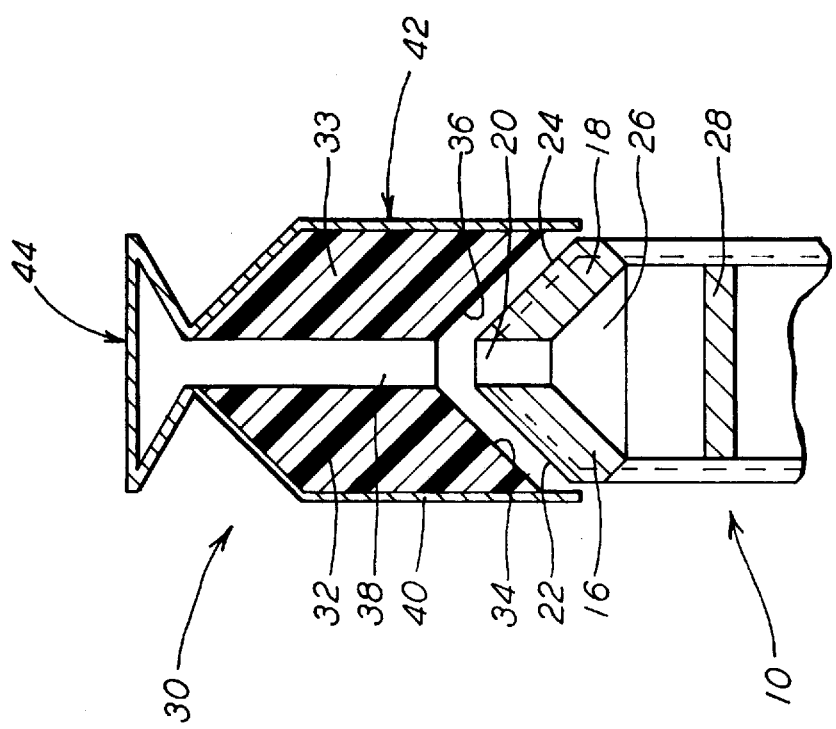
FIG. 3 shows the outer portion of the rotor and a brake shoe which may be applied to it.

FIG. 3 shows a radial section of the outer portion of disc 10, and a brake shoe 30 which may be applied to it. First annular portion 16 having first friction surface 22 is shown, as is the second annular portion 18 having second friction surface 24. The section is cut through one of the air passages 21 and shows spoke 28 and vane 26.

Brake shoe 30 has first brake pad 32 and second brake pad 33. Pad 32 has wear surface 34 and pad 33 has wear surface 36. Brake pads 32 and 33 are supported by pad support structure 40 which has side portions 42 and mounting means 44.

When brake shoe 30 is pressed radially inward, first pad friction surface 34 contacts first friction surface 22, and second pad friction surface 36 contacts second friction surface 24. Because the friction surfaces 22 and 24 and the pad friction surfaces 34 and 36 are sloped as shown, the normal pressure integrated over the contacting sloped surfaces exceeds the force with which brake shoe 30 is pressed inward. This excess of the normal pressure causes an increase of the friction force between the shoe 30 and the disc 10. Hence, with this sloped configuration, the braking torque which disc 10 applies to the rotating machinery (not shown) to which it is attached is increased. Axial forces between disc 10 and shoe 30 caused by the sloped friction surfaces 22, 24, 34 and 36 cancel out because surfaces 22 and 34 are sloped in opposition to surfaces 24 and 36.

It should be noted that this presently most preferred embodiment has a rim portion 14 in which the friction surfaces 22 and 24 are sloped so as to have the general form of a ridge 15, with gap 20 cut out of its center. A brake shoe 30 for application to this disc has the general form of a groove, with gap 38 cut out of its center.

Figure 4:
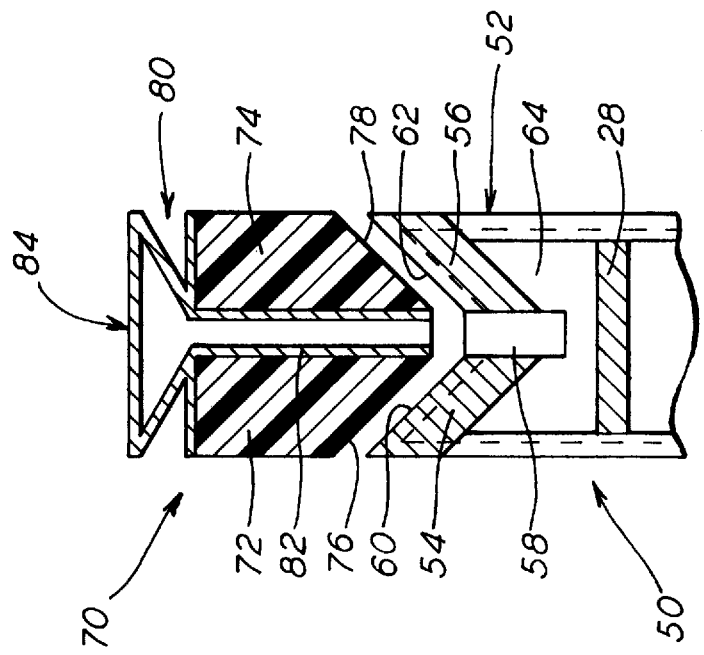
FIG. 4 shows the outer portion of an alternative embodiment of the invention, and a shoe which may be applied to it.

FIG. 4 illustrates an alternative embodiment of the present invention. Brake disc 50 has hub portion (not shown) similar to hub portion 12 of the previously described embodiment. Likewise, it has spokes 28 similar to those of the previous embodiment. However, brake disc 50 has first alternative annular portion 54 and second alternative annular portion 56 sloped so that first alternative friction surface 60 and second alternative friction surface 62 form a groove with cut away center 58. First alternative annular portion 54 and second alternative annular portion 56 are connected to spokes 28 by vanes 64.

FIG. 4 also shows an alternative brake shoe 70 for pressing against disc 50 to retard disc 50. Alternative shoe 70 has first alternative pad 72 and second alternative pad 74. First alternative pad 72 has first alternative pad friction surface 76 and second alternative pad 74 has second alternative pad friction surface 78. Alternative pads 72 and 74 are held by alternative pad support structure 80, which has inner portion 82 and mounting means 84. Axial forces between disc 50 and shoe 70 caused by the sloped friction surfaces 60, 62, 76, and 78 cancel out because surfaces 60 and 76 are sloped in opposition to surfaces 62 and 78.

Now discussing the invention more broadly, there is disclosed a brake disc having at least a portion 22 and 24 or 54 and 56 which is symmetrical about an axis, 29. The disc has a hub portion 12 and a rim portion, 14 or 52 having first annular portion 16 or 54 and second annular portion 18 or 56. At least one opening 20 or 58 is provided between first annular portion 16 or 54 and second annular portion 18 or 56. The first annular portion 16 or 54 has first friction surface 22 or 60 axisymmetric about axis 29, and second annular portion 18 or 56 has second friction surface 24 or 36 axisymmetric about axis 29. Means such as spokes 28 are provided for connecting hub portion 12 to rim portion 14 or 52.

The first friction surface 22 or 60 and second friction surface 24 or 62 are for contact with brake shoe 30 or 70. First friction surface 22 or 60 is sloped in opposition to second friction surface 24 or 62. Brake disc 10 or 50 has means for attachment such as bolt holes 13 to attach the disc to rotating machinery which is to be retarded.

The brake disc 10 may have friction surfaces 22 and 24 formed as conical surfaces, and brake disc 50 may have friction surfaces 60 and 62 formed as conical surfaces. Friction surfaces 22 and 24 of brake disc 10 are relatively disposed to form a circumferential ridge 15 having opening 20 cut away, and friction surfaces 60 and 62 of brake disc 50 are relatively disposed to form a circumferential groove having opening 38 cut away.

The means for attaching hub portion 12 to rim portion 14 or 52 may have resiliency so that rim portion 14 or 52 can expand thermally without causing undue stresses. This may be done by having spokes 28 inclined relative to radial lines from axis 29. The spokes 28 may be evenly spaced.

The hub 12 may have a central opening 11 so it can pass over a shaft or axle of rotating machinery to which it is to be attached. The hub 12 may have bolt holes 13 for attachment to rotating machinery.

Vanes 26 of disc 10 form air passages 21 which provide for cooling first annular portion 16 and second annular portion 18. These may provide passage of air from the inner radius to the outer radius of rim portion 14. Disc 10 may have a plurality of spokes 28 and a plurality of vanes 26, the vanes forming air passages 21 for cooling the first annular portion 16 and the second annular portion 18.

Each of the spokes 28 may be connected to one or more vanes 26 or to the first annular portion 16 or to the second annular portion 18. Spokes 28 may be attached to or formed integrally with some of the vanes 26. The number of vanes 26 may equal the number of spokes 28 multiplied by a predetermined integer. The vanes 26 may be about evenly spaced.

The spokes 28 may meet the hub portion 12 at a nonzero angle relative to a radial line from axis 29. The spokes may be approximately tangential to the outer surface of hub 12.

The spokes 28 may meet the rim portion 14 or 52 at an angle which is approximately perpendicular to the inner surface of rim portion 14 or 52. The spokes may be longer than they are wide, and have a width greater than their thickness, with the widthwise dimension approximately parallel to the axis 29. This choice of relative dimensions of the spokes provides mechanical flexibility so that disc 10 or 50 can accommodate thermal expansion of the rim portion 14 or 52 by a slight relative angular displacement of the hub 12 and the rim portion 14 or 52.

While a presently preferred and various additional alternative embodiments of the instant invention have been described in detail above in accordance the patent statutes, it should be recognized that various other modifications and adaptations of the invention may be made by those persons who are skilled in the relevant art without departing from either the spirit or the scope of the appended claims.

I claim:

1. A brake disc having at least a portion axisymmetric about an axis, said brake disc for attachment to rotating machinery for retardation of such rotating machinery, said brake disc comprising:
   (a) a hub portion for attachment to such rotating machinery;
   (b) a rim portion having a first annular portion and a second annular portion, said first annular portion and said second annular portion spaced apart axially, at least one opening between said first annular portion and said second annular portion, said first annular portion having a first friction surface axisymmetric about said axis, said first friction surface for contact with a brake shoe, said second annular portion having a second friction surface axisymmetric about said axis, said second friction surface for contact with a brake shoe, said first friction surface and said second friction surface sloped in opposition to one another, and
   (c) a plurality of substantially straight spokes being disposed in an intermediate range of radii between an outer radius of said hub portion and an inner radius of said rim portion, each of said spokes being connected to said hub portion and to said rim portion, said spokes being inclined relative to radial lines from said axis, said brake disc being generally open in said intermediate range of radii, with open space for airflow generally surrounding said spokes.

2. A brake disc according to claim 1 further having a plurality of vanes, said vanes connecting said first annular portion and said second annular portion, said vanes defining a plurality of air passages, said air passages for cooling said first annular portion and said second annular portion.

3. A brake disc according to claim 2 wherein at least a portion of said spokes are each one of connected to and formed integrally with a one of said vanes.

4. A brake disc according to claim 3 wherein said vanes are about evenly spaced.

5. A brake disc according to claim 2 wherein each of said spokes is connected to at least one of a vane and said first annular portion and said second annular portion.

6. A brake disc according to claim 2 wherein a number of said vanes equals a number of said spokes multiplied by a predetermined integer.

7. A brake disc according to claim 1 wherein said spokes meet said hub portion at a nonzero angle relative to a radial line from said axis.

8. A brake disc according to claim 7 wherein said spokes meet said hub portion at an angle which is about tangential to an outer surface of said hub.

9. A brake disc according to claim 1 wherein said first annular portion and said second annular portion are connected by vanes, said vanes defining a plurality of air passages, said air passages for cooling said first annular portion and said second annular portion.

10. A brake disc according to claim 9 wherein said air passages provide paths for air from an inner radius of said rim portion to an outer radius of said rim portion.

11. A brake disc according to claim 1 wherein said first friction surface and said second friction surface are conical surfaces.

12. A brake disc according to claim 1 wherein said first friction surface and said second friction surface are relatively disposed to constitute a circumferential groove in an outer portion of said rim portion, said groove having a bottom portion cut away.

13. A brake disc according to claim 1 wherein said first friction surface and said second friction surface are relatively disposed so as to form a ridge in an outer portion of said rim portion, said ridge having a top portion cut away.

14. A brake disc according to claim 1 wherein said spokes are about evenly spaced.

15. A brake disc according to claim 1 wherein said hub portion has a central opening to pass over one of a shaft and an axle of such rotating machinery.

16. A brake disc according to claim 1 wherein said hub portion has holes for bolts for attachment to such rotating machinery.

17. A brake disc according to claim 1 wherein said spokes each have a lengthwise dimension, a widthwise dimension, and a thickness dimension, said widthwise dimension less than said lengthwise dimension, said thickness dimension less than said widthwise dimension, and said widthwise dimension about parallel to said axis.

* * * * *